United States Patent
Lindenbauer et al.

(10) Patent No.: US 8,463,220 B2
(45) Date of Patent: Jun. 11, 2013

(54) SYSTEM FOR RECEIVING DIGITAL AUDIO DATA

(75) Inventors: Thomas Lindenbauer, Vienna (AT); Gerhard Furtner, Judenau (AT)

(73) Assignee: AKG Acoustics GmbH, Vienna (AT)

(*) Notice: Subject to any disclaimer, the term of this patent is extended or adjusted under 35 U.S.C. 154(b) by 160 days.

(21) Appl. No.: 13/178,247

(22) Filed: Jul. 7, 2011

(65) Prior Publication Data

US 2011/0311001 A1 Dec. 22, 2011

Related U.S. Application Data

(63) Continuation of application No. PCT/AT2009/000481, filed on Dec. 11, 2009.

(30) Foreign Application Priority Data

| Jan. 9, 2009 | (AT) | ........................... 33/2009 |
| Apr. 23, 2009 | (EP) | ..................... 09450089 |

(51) Int. Cl.
*H04B 7/00* (2006.01)

(52) U.S. Cl.
USPC ............ 455/277.1; 455/272; 455/226.1; 455/101

(58) Field of Classification Search
USPC ............ 455/277.1, 272, 226.1, 101, 278.1, 455/296, 231, 132, 134, 550, 63.1; 375/299
See application file for complete search history.

(56) References Cited

U.S. PATENT DOCUMENTS

| 3,859,601 | A | | 1/1975 | Curtis ........................... 325/305 |
| 4,057,758 | A | * | 11/1977 | Hattori et al. .................. 375/267 |
| 4,539,710 | A | * | 9/1985 | Dinsmore ...................... 455/134 |
| 4,752,968 | A | * | 6/1988 | Lindenmeier et al. ...... 455/277.2 |
| 4,878,252 | A | * | 10/1989 | Sessink ....................... 455/276.1 |
| 4,942,622 | A | * | 7/1990 | Takayama et al. .......... 455/277.2 |
| 4,977,615 | A | * | 12/1990 | Suzuki et al. ............... 455/277.2 |
| 5,313,660 | A | | 5/1994 | Lindenmeier et al. ........ 455/135 |

(Continued)

FOREIGN PATENT DOCUMENTS

| DE | 2 318 260 | | 4/1973 |
| DE | 3536826 | A1 | 4/1987 |

(Continued)

OTHER PUBLICATIONS

Goodman et al., "Waveform Substitution Techniques for Recovering Missing Speech Segments in Packet Voice Communications" IEEE Transactions on Acoustics, Speech, and Signal Processing, vol. ASSP-34, No. 6, pp. 1440-1448, Dec. 1986.

(Continued)

*Primary Examiner* — Minh D Dao
(74) *Attorney, Agent, or Firm* — Brinks Hofer Gilson & Lione

(57) ABSTRACT

A system for receiving digital audio data may include a diversity-receiving unit. The diversity-receiving unit may include at least two antennas and at least one receiving channel, which can be switched from one antenna to another antenna. To reduce audible disturbances in the receiving channel, a dropout concealment may be carried out when disturbances in the received audio signal occur. The dropout concealment may use intact audio signal parts before the disturbance and/or after the disturbance to synthesize the concealment signal. The receiving channel may be switched to another antenna as a function of whether the dropout concealment is activated.

20 Claims, 12 Drawing Sheets

U.S. PATENT DOCUMENTS

| | | | | |
|---|---|---|---|---|
| 5,379,449 | A | * | 1/1995 | Porambo ............... 455/506 |
| 5,465,411 | A | * | 11/1995 | Koike .................... 455/275 |
| 5,499,397 | A | * | 3/1996 | Wadin et al. ........ 455/277.1 |
| 5,603,107 | A | * | 2/1997 | Gottfried et al. ....... 455/133 |
| 5,697,075 | A | * | 12/1997 | Kim ....................... 455/133 |
| 5,777,693 | A | * | 7/1998 | Kishigami et al. ...... 348/731 |
| 5,822,429 | A | * | 10/1998 | Casabona et al. ....... 380/252 |
| 5,844,632 | A | * | 12/1998 | Kishigami et al. ...... 348/706 |
| 5,883,921 | A | * | 3/1999 | Andren et al. .......... 375/150 |
| 6,118,990 | A | * | 9/2000 | Matsumoto ........... 455/277.1 |
| 6,169,888 | B1 | * | 1/2001 | Lindenmeier et al. .. 455/277.2 |
| 6,292,516 | B1 | * | 9/2001 | Petsko et al. .......... 375/267 |
| 6,430,404 | B1 | * | 8/2002 | Lindenmeier et al. ... 455/132 |
| 6,519,473 | B1 | * | 2/2003 | Park et al. ............. 455/522 |
| 6,574,461 | B1 | * | 6/2003 | Skold .................. 455/277.2 |
| 6,611,677 | B1 | * | 8/2003 | Lindenmeier et al. ... 455/135 |
| 6,807,404 | B2 | * | 10/2004 | Meijer ................. 455/277.2 |
| 6,871,054 | B2 | | 3/2005 | Kenkel et al. ........ 455/277.1 |
| 7,116,952 | B2 | | 10/2006 | Arafa .................... 455/132 |
| 2006/0067442 | A1 | | 3/2006 | Tanaka .................. 375/347 |
| 2007/0019764 | A1 | | 1/2007 | Yang et al. ............. 375/347 |
| 2007/0168819 | A1 | | 7/2007 | Buhe et al. ............. 714/746 |
| 2009/0306972 | A1 | | 12/2009 | Opitz et al. ............. 704/203 |

FOREIGN PATENT DOCUMENTS

| | | |
|---|---|---|
| DE | 3926336 A1 | 2/1991 |
| DE | 42 36 088 A1 | 4/1994 |
| DE | 60111765 T2 | 5/2006 |
| DE | 202006007918 U1 | 10/2006 |
| EP | 02-18843 A1 | 8/1986 |
| EP | 0755131 A2 | 1/1997 |
| JP | 61-073437 | 4/1986 |
| JP | 02-062131 | 3/1990 |
| JP | 02-305234 | 12/1990 |
| JP | 08-107306 | 4/1996 |
| JP | 10-163941 | 6/1998 |
| JP | 2001-326593 | 11/2001 |
| WO | WO 92/13399 | 8/1992 |
| WO | WO 02/28120 A2 | 4/2002 |
| WO | WO 2008/074343 A2 | 6/2008 |
| WO | WO 2010/078605 A1 | 7/2010 |

OTHER PUBLICATIONS

Irino T., Patterson R.D.; "A compressive gammachirp auditory filter for both physiological and psychophysical date"; J. Acoust. Soc. Am., vol. 109, pp. 2008-2019, 2001.

Deller J.R., Hansen J.H.L., Proakis J.G.; "Discrete-Time Processing of Speech Signals"; IEEE Press; ISBN 0-7803-5386-2, pp. 352-405, 2000.

Carter, G. C.: "Coherence and Time Delay Estimation"; Proc. IEEE, vol. 75, No. 2, pp. 236-254, Feb. 1987.

Omologo M., Svaizer P.: "Use of the Crosspower-Spectrum Phase in Acoustic Event Location", IEEE Trans. on Speech and Audio Processing, vol. 5, No. 3, pp. 288-292, May 1997.

International Search Report and Written Opinion, PCT/AT2009/000481, Mar. 24, 2010, 8 pgs.

* cited by examiner

SYSTEM FOR RECEIVING DIGITAL AUDIO DATA

PRIORITY CLAIM

This application is a continuation of PCT/AT2009/000481, filed Dec. 11, 2009, which claims the benefit of the filing date under 35 U.S.C. §119(e) of A 33/2009, filed Jan. 9, 2009, and EP 09450089.9 filed Apr. 23, 2009, all of which are incorporated by reference.

BACKGROUND OF THE INVENTION

1. Technical Field

The invention pertains to a system for receiving digital audio data with a diversity receiver, which has at least two antennas and at least one receiving channel.

2. Related Art

Multiple antennas may be used in a diversity scheme to improve the quality and reliability of a wireless link. Examples of systems using antenna diversity include global positioning systems and other radio frequency (RF) communication systems. In an example of a diversity system using "true diversity," two identical signal paths may be realized, each of them having a complete diversity part and a complete receiver part. In dependence of an RF-level (such as the RF-level indicated by the Receiver-Signal-Strength-Indicator (RSSI) of a demodulator) a demodulated audio signal with a higher RF-level may be used. The use of two identical signal paths may increase hardware and power requirements. In another example of a diversity system, antenna diversity may be used. Antenna diversity may involve two signal paths with antennas that are combined to a common path having one RF receiver. In one example, in dependence on a changing RSSI signal (or if the RF/RSSI-level falls below a defined threshold) the active antenna can be changed using a switch, such as semiconductor-switch (pin-diode).

SUMMARY

A system for receiving digital audio data may include an (type) antenna-diversity receiving device, which can be used in applications such as in professional, digital wireless microphone systems. The system may be used, for example, for stage microphones in the areas of tour sound, installed sound and broadcast and must satisfy high receiving robustness, very limited latency, high audio quality and audio transmission as free of interruption as possible. The diversity receiving device may include two or more receiving antennas. The diversity receiving device can be switched from one antenna to another antenna. The two or more antennas can receive a radio signal in the form of audio data and provide the audio data to at least one receiving channel. The audio data may be continuously streaming digital audio data. The diversity receiving device may include a switching unit, with which the receiving channel can be switched from one antenna to another antenna.

The diversity receiving device may receive transmitted audio data that is coded with an error tolerances method. Coding can be conceived, so that individual bit errors are inaudible in the foreground or are made inaudible by error-correcting methods. In each case, reliable bit-error recognition may be used to monitor the audio quality at each time of the transmission. The RF receiving quality at the receiver may also be substantially continuously determined and a most favorable antenna selected for the receiving channel according to receiving quality of the transmitted audio data. In order to be able to determine substantially continuously which receiving quality of an antenna prevails at the current receiving frequency, the received signal of each antenna may be demodulated.

The system for receiving digital audio data may provide a diversity-receiving unit, in which switching to another antenna is not audible in the audio signal itself, and transmission errors prior to the switching process are not recordable for the listener. Such switching artifacts and errors in transmission may not be audible to a user due to a concealment signal. The concealment signal may be generated and placed on the receiving channel instead of the received audio signal.

Dropout concealment may be carried out in the receiving channel when receiving disorders occur, in which case dropout concealment uses audio signal parts before the disturbance and/or after the disturbance to synthesize the concealment signal. The receiving channel may be switched to another antenna as a function of whether the dropout concealment is activated.

In one example, a criterion for switching of the antenna is activation of dropout concealment, if, instead of the transmitted audio signal, a concealment signal is switched to the output of the receiving channel. Since the concealment signal is synthesized, starting from an intact audio signal, in which both signal fractions before the disturbance and signal fractions after the disturbance can be incorporated, the transition and the period in which the concealment signal is switched is not recordable as a disturbance. The fact that signal fractions after the disturbance can also be used may become possible by adding an additional latency for the entire system.

In the time, in which the concealment signal is active, a switch from a first antenna to a second antenna can be carried out, and then, without any interruption audible to a user, the audio signal supplied from the second antenna may be released onto the receiving channel with sufficient receiving quality, and without interruption.

The difference of error-correction and error-concealment may lie in the fact that during error-concealment, no additional redundancy need be added to the original audio signal during source-coding in the transmitter before transmission. The rate of the useful data is therefore at maximum. The restored audio signal is obtained from statistical dependences of the audio material before and after receiving a dropout. Overblending of the original data with the concealment data and the reverse can also be imagined during concealment of antenna switching.

In one example, switching to another antenna may occur during the concealment process, therefore at a time, at which the transmitted (defective) signal is no longer present at the output of the receiving channel, but the synthesized concealment signal is already active and at the output. Switching has no effects on the output signal, since the artificially created concealment signal is only replaced after switching of the receiving channel from the existing antenna to the new antenna occurs.

In another example, the digital data stream contains so-called guard intervals. These are intervals of streaming data in which no audio signals are transmitted. Switching to another antenna may occur within the guard interval so that no disturbances are audible to the user since there is no audio data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
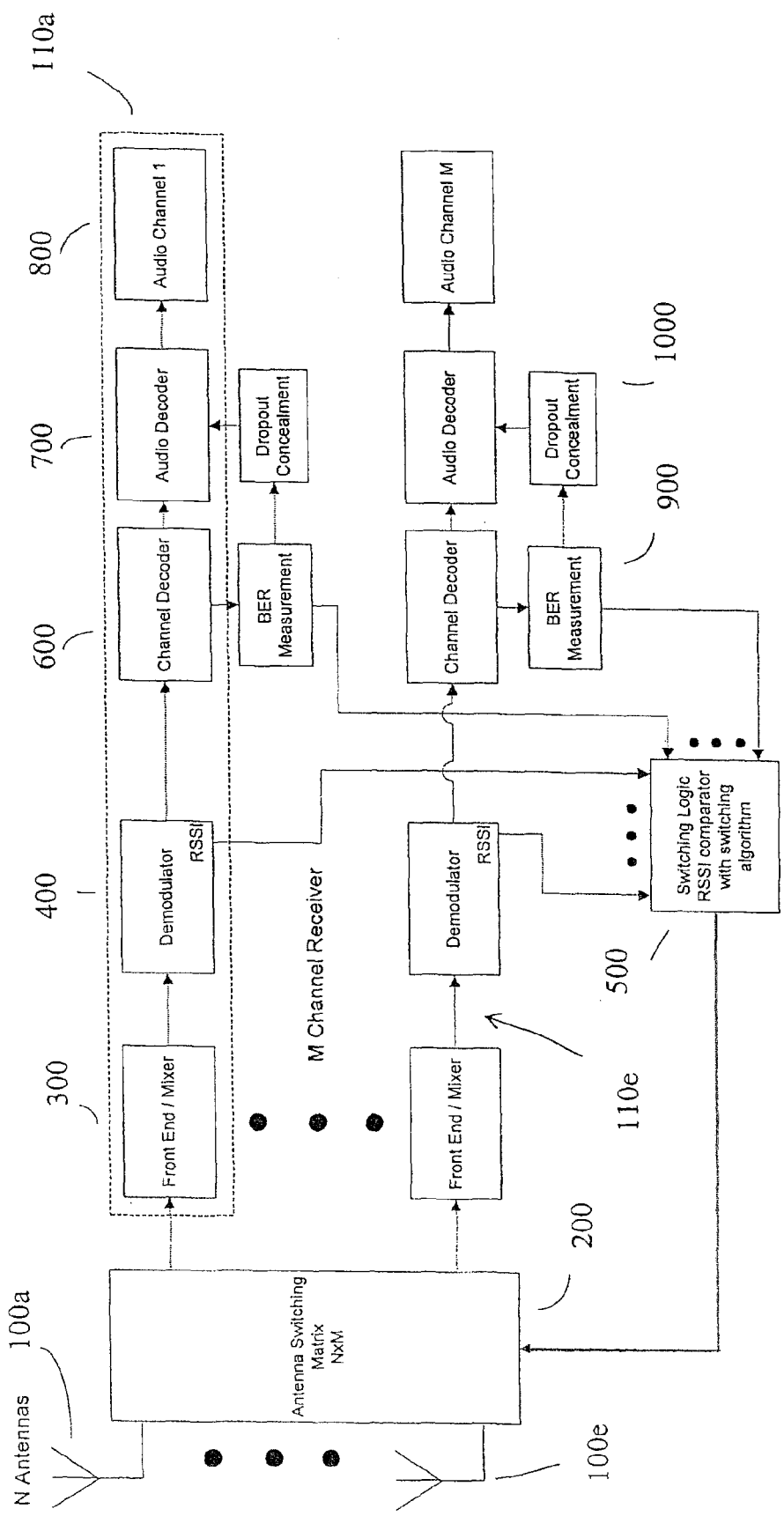
FIG. 1 shows an example schematic block diagram of a diversity-receiving unit.

In antenna diversity receivers for professional wireless systems the RF signals coming from two antennas can be directly switched (without amplifying) in dependence of the RF-level and/or the gradient of the signal strength of the actual antenna. However, this may increase the noise figure of the receiver caused by the attenuation of the antenna switch.

In a wireless radio transmission the quality of a transmitted low frequency signal has to be kept as good as possible, that means that the signal to noise ratio (SNR) has to be as high as possible. For professional wireless systems it is a benefit, if a diversity system can be used. With a diversity system the negative influences on the transmitted audio-quality caused by the RF-signal fading effects (dropouts) during the movement of the actor can be reduced or even avoided. This is the reason why professional wireless systems have diversity systems for their receiver installed.

An antenna-diversity system with two antennas and a receiving channel, can be switched via a switch from one antenna to another antenna. Switching to the other antenna may occur when stipulated criteria or threshold values concerning signal quality are reached. Such a decision may occur as a function of signal intensity (determination of RSSI level) and/or the bit-error rate (BER), whether it is more favorable to switch to the other antenna. If the corresponding criteria for switching are met, a switch may be operated so that the receiving channel can be alternately connected to one of the two antennas. The signal demodulated in the receiving channel may represent a data stream during digital audio transmission which is organized in periodic transmission frames. A transmission frame, i.e., a defined data stream section, may consist of a preamble or header, the data (payload) and a so-called guard interval as illustrated in the example of FIG. 4. The information contained in the preamble may serve to synchronize the transmitting signal with the receiver, the data may include actual audio data, together with control and information data such as control and information data of a digital radio link, and can also have redundancy to recognize and correct bit errors during transmission. The guard interval, in which no audio information is transmitted, may serve as a blanking interval in order to be able to determine, such as in real time, the receiving intensity of the other antenna for a short time without audio interruption. In addition, the guard interval may provide a period of time when switching between antennas may occur without audible effects of the switching being noticed by a user. Without this guard interval, an antenna-diversity system switching to the other receiving antenna may encounter undesired or audible interruptions in the audio stream.

Such undesired or audible interruptions in the audio stream may be difficult to compensate for in latency-critical radio applications, such as in wireless stage engineering, even with error-correcting methods (forward error correction). The durations of an antenna switching process, measurement of the receiving field intensity on the other antenna and switching back to the original antenna, may not be performed adequately by bit error-correcting methods without keeping the audio transmission latency low and to an extent tolerable for use. Moreover, if the transmission quality is poor and error-correction of the system is already burdened with correcting bit errors in the transmission channel such switching may be difficult, especially in view of the possibility of a reduced time head room for antenna switching. Switching to another antenna without additional measures, therefore becomes noticeable to a user in an audio signal as a disturbance, e.g., crackling.

In the time interval of the guard interval and the antenna switching points defined with it, in which switching can be carried out without interrupting the audio data, the receiving quality on the current antenna can already be strongly reduced from the preceding switching point. This can occur through the generally poor receiving situation, for example, the transmitter situated at the limit of the receiving range, or a dropout occurs. Consequently, undesired or unpleasant noise or brief but recordable interruption of the audio signal can be experienced by the listener. These drawbacks are difficult to eliminate but the effects may be limited by, for example, keeping the frame length as small as possible and therefore increasing the frequency of the switching points. One expedient which however, runs counter to this is to maximize the throughput rate of the useful data. In digital, professional wireless microphony, the data transmission rate actually represents one of the largest technical challenges. The audio quality required by users should exceed that of the analog system, in which case the transmitting bandwidth permitted from regulations may scarcely surpass that of the analog systems. The transmission channel therefore may come up against the limits of spectral efficiency of digital transmission methods, which may lead to design of the useful data rates as high as possible, without accepting deteriorations in receiving sensitivity, i.e., with the same transmitter-to-receiver range.

The digital audio data receiving system may operate with a frame length of payload data that need not be shortened in order to guarantee audio transmission as free of interruptions as possible and therefore produce data rates that come close to the maximum useful data rate of a true diversity system.

FIG. 1 shows a block diagram of the system for receiving digital data in the form of a diversity-receiving device with several antennas 100a to 100e, which are connected via an antenna switching matrix 200, to receiving channels 110a to 110e. Each receiving channel includes a receiver front end 300 (which may provide for preamplification, filtering and/or metering), a demodulator 400 (which may demodulate the carrier frequency), a channel decoder 600 (which may assign analog signal shape bits) and an audio decoder 700 (which may provide decoding and/or decompression of the audio files). If the transmitted audio signals are always free of disturbances, these components would be sufficient to guarantee corresponding receiving quality.

Since disturbances (loss or compromise of received data) occur in reality, which, in many cases, are caused by fading (destructive multipath propagation, dropout), measures may be taken to minimize transmission errors and make them inaudible to a user. As can be seen from FIG. 1, the signal intensity of the modulated signal (for example, quantified by the RSSI level) is determined. The signal emerging from channel decoder 600 may be checked in a bit error rate (BER) measurement unit with respect to bit error rate. It is also possible for the channel decoder 600 to assume this task and furnish the information via the BER. Alternatively, the bit error rate (BER) or the signal intensity may be omitted. If the RSSI level falls short of a predefined threshold value and/or the bit error rate surpasses a predefined threshold value, the dropout concealment is activated and a concealment signal is synthesized/generated by a concealment unit 1000, and placed on the receiving channel in place of the transmitted audio signal by the audio decoder 700. This is fed through the audio decoder 700, at whose output the concealment signal is now present instead of the transmitted signal.

The switching matrix 200 is controlled by switching logic 500, such that the combination may form a switching unit. The switching logic 500 uses the information bit error rate of the BER measurement unit 900, and optionally, or in addition, or alternatively, the level of the signal (RSSI) from demodulator 400, in order to switch the optimal antenna to the receiving unit.

Figure 2:
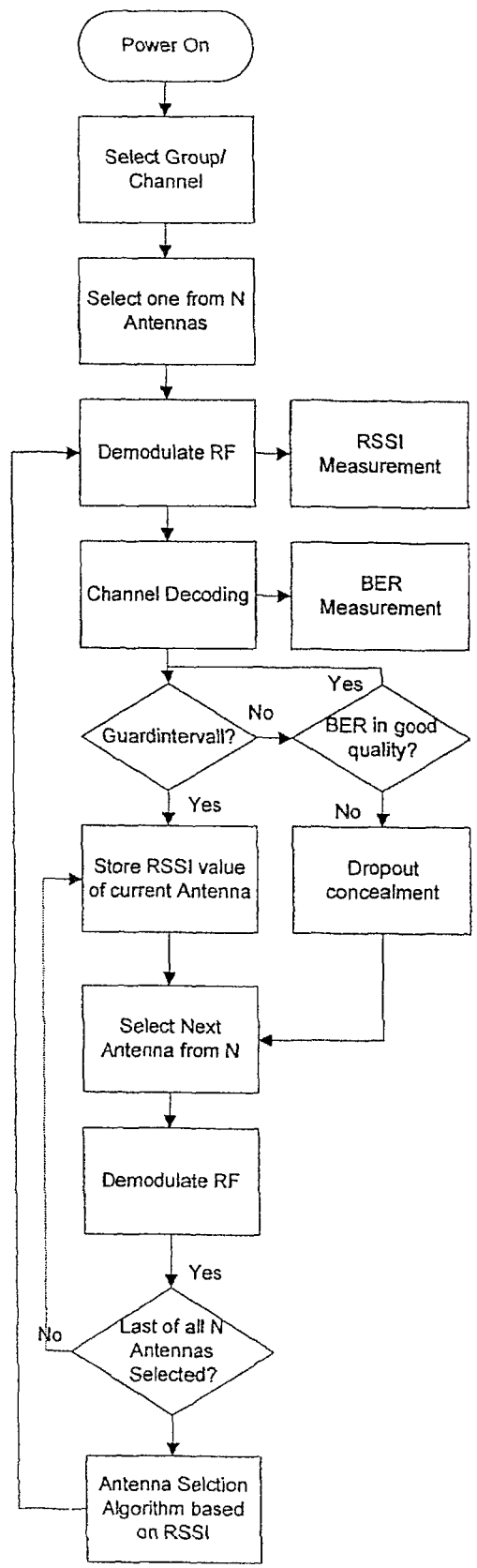
FIG. 2 shows a flow chart of an example operation of the system.

According to one example, depending on whether concealment (dropout concealment unit 1000) was activated, a switch is made to another antenna. In other words, switching between antennas may only take place after the synthesized concealment signal is supplied on the receiving channel. FIG. 2 shows a corresponding flowchart of example operation. As soon as dropout concealment is reactivated, the switching logic 500 begins to seek the optimal antenna again. With this method, the system may not rely on the guard interval (FIG. 4b), or gaps between the audio data, to wait and only then carry out switching. Instead, during use of dropout concealment, a reaction can occur at any time and a change made to a better antenna by switching. If the bit error rate in the newly selected antenna is of good quality beforehand, it may wait to the next guard interval and dropout concealment until switching logic 500 becomes active again.

Owing to the fact switching can be carried out between antennas while dropout concealment is active, i.e., during receipt of the audio data blocks (payload, FIG. 4b), in some examples it is no longer necessary to include guard intervals in the data stream. Accordingly, the data stream may be a stream of digital audio data that is provided as seamless and continuously unbroken digital audio stream. Because of this, more audio data per unit of time can be transmitted, processed, and output in audible form for a user. In addition, due to selective activation of the dropout concealment, switching between antennas may occur while the streaming digital audio data is being received without audible artifacts being experience by a user.

Another variant can provide that guard intervals are present, but the guard intervals may be configured to be much shorter than would otherwise be need in the absence of the dropout concealment. For example, if it was necessary or desired to have a guard interval, during which a receiving channel was switched to another antenna, and if this antenna was determined to have even poorer reception, the switching unit can switch the receiving channel back again to the previous antenna, or to a different antenna during the time period when the concealment signal is provided on the receiving channel in the absence of a guide interval. Alternatively, switching to another antenna may occur during the time period when the concealment signal is provided on the receiving channel in the absence of a guide interval, and switching back to the previous antenna may occur during the guide interval when dropout concealment is being provided. In still another alternative, switching to another antenna and switching back to the previous antenna may both occur during the time period when the concealment signal is provided on the receiving channel in the absence of a guide interval. In this example, the switching to another antenna and the switching back to the previous antenna may occur in the same time period when the concealment signal is provided, or in different time periods when the concealment signal is provided. Thus, it is possible with the present system to make the guard interval so short that only one switching process to another antenna is sufficient [or necessary], or eliminate the guard interval entirely such that the digital stream of data is continuously provided without any form of guard interval or gap in the digital stream of data. A switching process occurring before or after can then occur during dropout concealment activity. For example, switching to another antenna during dropout concealment activity could occur, and switching back from this antenna to the original antenna in the subsequent guard interval in the same or a difference dropout concealment activity. With the present system, not only can transmission quality therefore be improved, but also the audio data transmitted per unit time can be increased.

Figure 3:
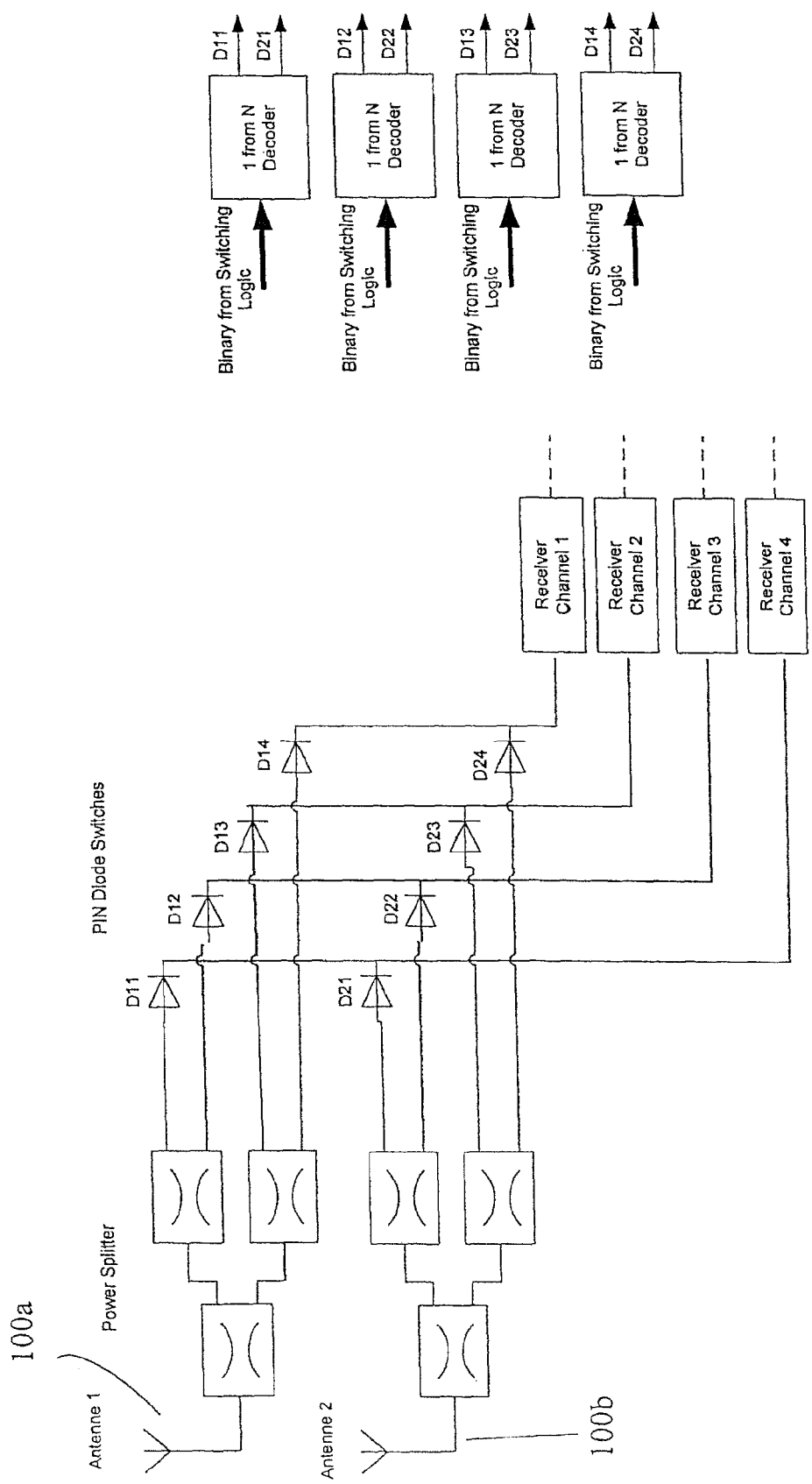
FIG. 3 shows an example schematic block diagram, including the switching matrix, for two antennas and four receiving channels.

FIG. 3 shows a block diagram of a variant of an antenna switching matrix. This antenna switching matrix is laid out for two antennas, but can be expandable to three or more antennas. Overall, there are four receiving channels per antenna, each of which is branched by a power splitter.

The signal of each antenna is divided to the signal paths according to the number of receiving channels. There, the optimal antenna is switched to the corresponding receiving channel with multiplexers (for example, pin diode switches, common in HF technology). Only one diode of a diode pair D11-D21; D12-D22; D13-D23; D14-D24 may always be active. In the general case with N antennas and M receivers, M−1 power splitters with 2 outputs per antenna may be required (with about $\log_2(M)$ consecutive arrangements). And M HF multiplexers with N inputs, i.e., M×N diode switches. These switches are controlled by M "1 of N" decoders, in which only one of the D1$x$, D2$x$, D3$x$, . . . DM$x$ diodes is active. Thus, instead of M×N RF front ends (RF receiver units), only M RF front ends are sufficient.

Dropout concealment may occur in any of a number of waveform substitution techniques, such as, for example, those described in. the publication: Goodman et al., "Waveform Substitution Techniques for Recovering Missing Speech Segments in Packet Voice Communications", IEEE Transactions on Acoustics, Speech, and Signal Processing, VOL. ASSP-34, No. 6, December 1986.

Figure 4A:
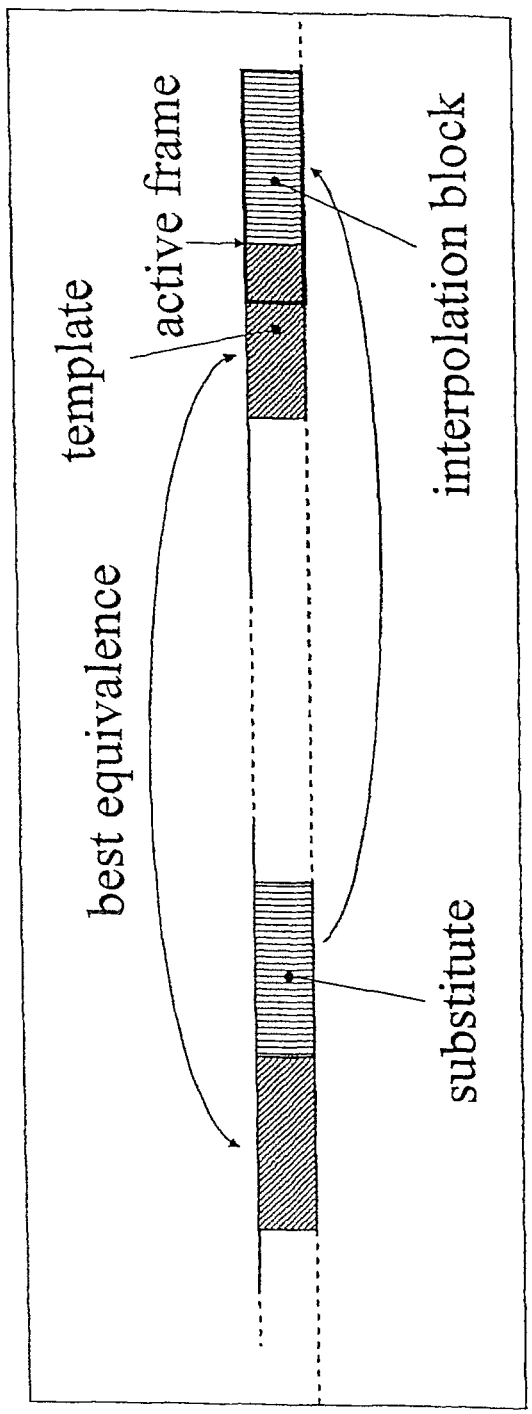
FIG. 4a shows an example dropout concealment.
Figure 4B:
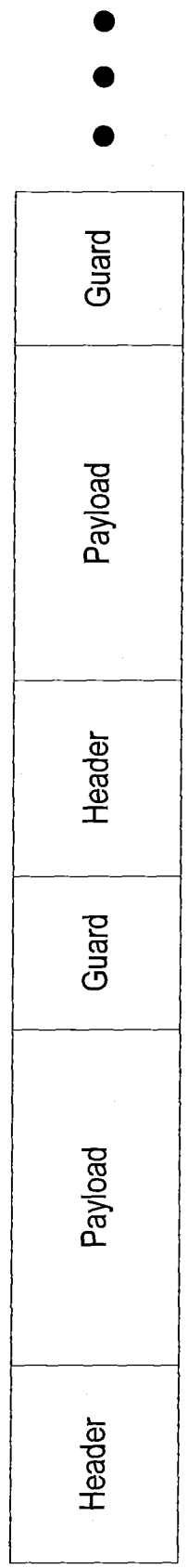
FIG. 4b shows an example data stream with periodic guard intervals, in which no audio information is transmitted.
Figure 5:
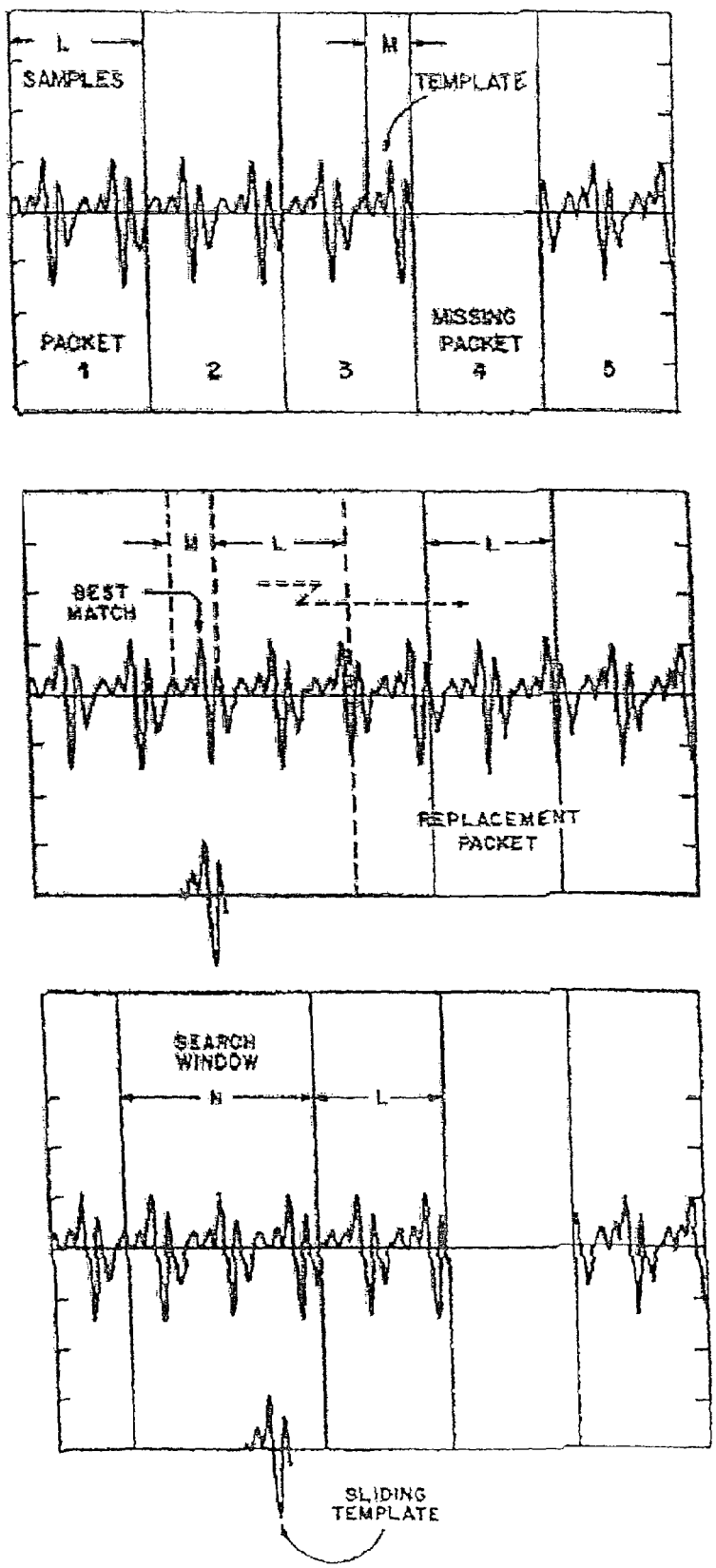
FIG. 5 shows an example of the principle of dropout concealment.

In another example technique, the basis of the method sketched in FIGS. 4a and 5 is period estimation, in which the period of the audio signal is estimated and the audio signal then continued from the past.

For this purpose, right before dropout of the audio signal (referred to as active frame in FIG. 4a), the so-called template is taken from the signal cutout and sought in the past (period estimation). The signal after the template equivalent is copied from the past and inserted forward to mask the signal dropout.

The template is compared with the past alternatively, for example, by the following formulas:

Autocorrelation:

$$r(\tau) = \frac{1}{N}\sum_{n=0}^{N-1} x_S(n) x_P(n+\tau)$$

or: Average magnitude difference function (AMDF)

$$\sum_{n=0}^{N-1} |x_S(n) - x_P(n+T_0)| = 0$$

and $$\sum_{n=0}^{N-1} [x_S(n) - x_P(n+T_0)]^2 = 0$$

or: Difference functions (Goodman, et al., 1986):

$$d_4(\tau) = \frac{1}{N}\sum_{n=0}^{N-1} \left| \frac{x_S(n)}{\sqrt{\sum_{j=0}^{N-1} x_S(j)^2}} - \frac{x_P(n+\tau)}{\sqrt{\sum_{j=0}^{N-1} x_P(j+\tau)^2}} \right|$$

$$d_5(\tau) = \frac{1}{N}\sum_{n=0}^{N-1} \left| \frac{x_S(n)}{\sqrt{\sum_{j=0}^{N-1} |x_S(j)|}} - \frac{x_P(n+\tau)}{\sqrt{\sum_{j=0}^{N-1} |x_P(j+\tau)|}} \right|$$

$$d_6(\tau) = \frac{1}{N}\sum_{n=0}^{N-1} \left| \frac{x_S(n)}{x_{S,max} - x_{S,min}} - \frac{x_P(n+\tau)}{x_{P,max} - x_{P,min}} \right|$$

Another possible example of dropout concealment methods is described further below, and another example is described in U.S. patent application Ser. No. 12/479,046 filed on Jun. 5, 2009, whose contents are entirely incorporated by reference.

The methods described can be applied, both to an individual channel, and also in the sense of the multichannel concealment described further later. In the latter case, the information of the adjacent channels would be used in order to mask the signal of one channel. In this case, the channels would no longer be independent from each other, at least during concealment. This multichannel dropout concealment could be implemented with a diversity-receiving unit according to FIG. 3. The four channels shown correspond to the multichannel arrangement of the following description.

Figure 6:
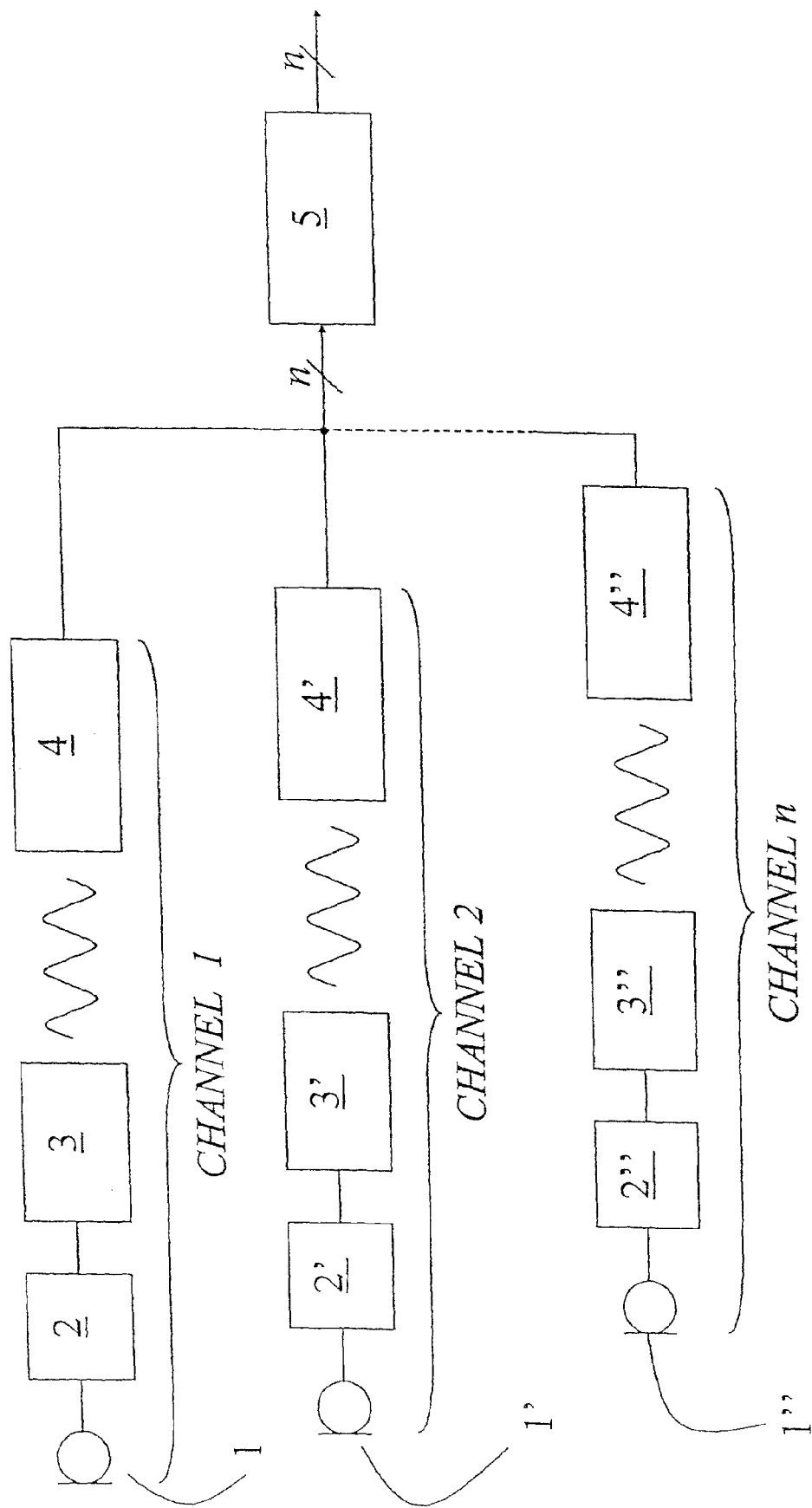
FIG. 6 shows a schematic representation of an example transmission chain.

The preferred but not only area of application is within the overall system of a multi-channel (optionally wireless) transmission of digital audio data. The entire structure of a transmission chain is depicted in FIG. 6 and typically comprises the following stages for one channel: Signal source 1, e.g. a sensor for recording signals (microphone), analog-digital converter 2 (ADC), optional signal compression and coding on the transmitter side, transmitter 3, transmission channel, receiver 4, concealment module 5. At the output of the concealment module 5, the audio signal is available in digital form—further signal processing units can be connected directly, for example a pre-amp, equalizer, etc.

The proposed concealment method is independent of the transmitter/receiver unit as well as the source coding and acts solely on the receiver side (receiver-based technique). It can therefore be integrated flexibly as an independent module into any transmission path. In some transmission systems (e.g. digital audio streaming), different concealment strategies are implemented simultaneously. While the application shown in FIG. 6 does not provide for any further concealment units, a combination with alternative technologies is possible.

The following application scenarios are provided exemplarily:

In concert events and stage installations, multi-channel arrangements range from stereo recordings to different variations of surround recordings (e.g. OCT Surround, Decca Tree, Hamasaki Square, etc.) potentially supported by different forms of spot microphones. Especially with main microphone setups, the signals of the individual channels are comprised of similar components whose particular composition is often quite non-stationary. For example, in the present system a dropout in one main microphone channel can be concealed introducing little or no latency.

Multi-channel audio transmission in studios proceeds at different physical layers (e.g. optical fiber waveguides, AES-EBU, CAT5), and dropouts can occur for various reasons, for example due to loss of synchronization, which must be prevented or concealed especially in critical applications such as, for example, in the transmission operations of a radio station. Here, too, the concealment method of the system can be used as a safety measure with a low processing latency.

While audio transmission in the internet is less delay-sensitive than the above-mentioned areas, transmission errors occur more frequently, resulting in an increased degradation of the perceptual audio quality. The concealment method of the system offers an improvement of the quality of service.

The method according to the system can also be used in the framework of a spatially distributed, immersive musical performance, i.e. in the implementation of a collaborative concert of musicians that are separated spatially from each other. In this case, the ultra-low latency processing strategy of proposed algorithm benefits the system's overall delay.

The invention is not restricted to the following embodiments. It is merely intended to explain the inventive principle and to illustrate one possible implementation. In the following, the dropout concealment method is described for one channel afflicted with dropouts. If transmission errors occur in more than one channel of the multi-channel arrangement, the system can easily be expanded.

The following terminology is used in the description: The channel afflicted with dropouts is defined as target channel or signal. The replica (estimation) of this signal that is to be generated during dropout periods is referred to as replacement signal. At least one substitution channel is required for the computation of the replacement signal. The proposed algorithm is composed of two parts. Computations of the first part are carried out permanently, whereas the second part is only activated in the case of a dropout in the target channel. During error-free transmission, the coefficients of a linear-phase FIR (finite impulse response) filter of length $L_{Filter}$ are permanently being estimated in the frequency domain. The required information is provided by the optionally non-linearly distorted and optionally time-averaged short-term magnitude spectra of the target and substitution channel. This new type of filter computation disregards any phase information and thus, differs fundamentally from the correlation-dependent adaptive filters.

Selection of the Substitution Channel or Substitution Channels

Figure 7:
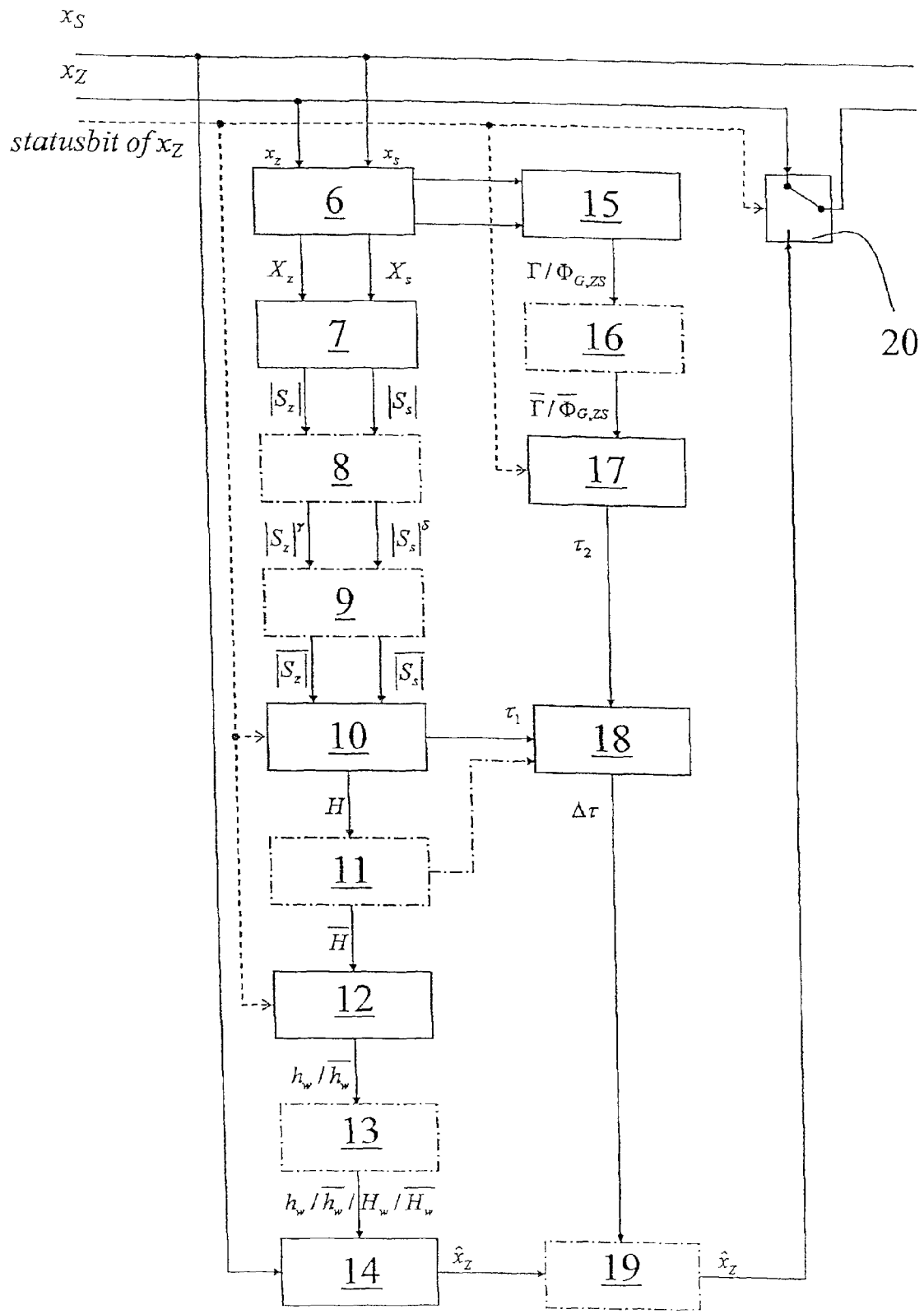
FIG. 7 shows a detailed block diagram of an example of dropout concealment for a two-channel system.

FIG. 7 shows a block diagram of the multi-channel dropout concealment method for a target signal $x_Z$ and a substitution signal $x_S$. The individual steps of the method are each indicated by a box containing a reference symbol and denoted in the subsequent table:

6 Transformation into a spectral representation
7 Determination of the envelope of the magnitude spectra
8 Non-linear distortion (optional)
9 Time-averaging (optional)
10 Calculation of the filter coefficients
11 Time-averaging of the filter coefficients (optional)
12 Transformation into the time domain with windowing
13 Transformation into the frequency domain (optional)
14 Filtering of the substitution signal respectively in time or frequency domain
15 Estimation of the complex coherence function or GXPSD
16 Time-averaging (optional)
17 Estimation of the GCC and maximum detection in the time domain
18 Determination of the time delay $\Delta\tau$
19 Implementation of the time delay $\Delta\tau$ (optional)

In this example, the transition between target and replacement signal is indicated by a switch 20. A detailed explanation of the individual steps of the method is given in the following description.

The correct selection of a substitution channel depends on the similarity between the substitution and target signal. This correlation can be determined by estimating the cross-correlation or coherence. (See explanations on coherence and on generalized cross-power spectral density (GXPSD) described later.) In one example, the (GXPSD) is proposed as potential selection strategy. The complex coherence function $\Gamma_{ZS,j}(k)$ is used as particular example in embodiments 1 to 9. (A total of K channels are observed, the channel $x_0(n)$ being designated as the target channel $x_Z(n)$.):

1. For the target channel $x_Z(n)$, the $J^{th}$ channel is defined as a substitution signal by the optionally time-averaged coherence function $\overline{\Gamma_{ZS,j}(k)}$ between the channels $x_j(n)$, with $1 \leq j \leq K-1$ and the target channel $x_S(n)=x_j(n)$, whose frequency-averaged value of the complex coherence function, $$\chi(j) = \frac{1}{N} \sum_{k=0}^{N-1} |\overline{\Gamma_{ZS,j}(k)}|,$$

has a maximum value according to:

$$J = \arg\max_j \chi(j).$$

2. Alternatively, a fixed allocation can be established between the channels in advance if the user (e.g. a sound engineer) knows the characteristics of the individual channels (according to the selected recording method) and hence their joint signal information.
3. Likewise, several channels can be summed to one substitution channel, optionally in a weighted manner. This weighted combination can be set up by the user a priori.
4. In an alternative realization, the superposition of several channels to one substitution channel is carried out on the basis of broadband coherence ratios to the target channel by:

$$x_S(n) = \frac{\sum_j \{\chi(j) \cdot x_j(n - \Delta\tau_j)\}}{\sum_j \chi(j)},$$

for all $\{do(j) = \text{false}\}$.

Herein, $x_S(n)$ denotes the substitution channel composed of the channels $x_j(n-\Delta\tau_j)$, and $\chi(j)$ represents the frequency-averaged coherence function between the target channel $x_Z(n)$ and the corresponding channel $x_j(n-\Delta\tau_j)$. The time delay between the selected channel pairs is considered by $\Delta\tau_j$ (c.f. section "Estimation of the time delay between target and substitution channel"). The validity of the potential signals is verified incorporating the status bit $do(j)$.

5. A simplification of 4. is proposed that considers a preselected set of channels $\tilde{J}$ rather than all available channels j. The weighted sum is built using $\chi(j)|_{j \in \tilde{J}}$. The pre-selection is intended to yield channels whose frequency-averaged coherence function exceed a prescribed threshold $\Theta$:

$$\tilde{J} = \{j | (1 \leq j \leq K-1) \wedge (\chi(j) > \Theta)\}.$$

6. Furthermore, a maximum number of M channels (with preferably M=2 . . . 5) can be established as a criterion, according to:

$$\tilde{J} = \{j_i | (1 \leq j_i \leq K-1) \wedge (1 \leq i \leq M) \wedge [\chi(j_i) > \chi(l), \forall l \in \{1, \ldots, K-1\} \setminus \{j_1, \ldots, j_M\}]\}.$$

7. A joint implementation of both constraints 5. and 6. is also possible:

$$\tilde{J} = \{j_i | (1 \leq j_i \leq K-1) \wedge (1 \leq i \leq M) \wedge (\chi(j_i) > \Theta) \wedge [\chi(j_i) > \chi(l), \forall l \in \{1, \ldots, K-1\} \setminus \{j_1, \ldots, j_M\}]\}.$$

8. Alternatively, the selection can be carried out separately for different frequency bands, i.e. in each band the "optimal" substitution channel is determined on the basis of the coherence function, the respective band pass signals are filtered using the method according to the system, optionally in a time-delayed manner (c.f. "Estimation of the time delay between target and substitution channel"), superposed and used as a replacement signal. In so doing, the same criteria apply as in 1., 4., 5., 6. and 7., though the frequency-independent function $|\epsilon_{ZS,j}(k)|$ must be implemented instead of the frequency-averaged function $\chi(j)$.
9. Several substitution channels can also be selected. In this case, the processing is carried out separately for each channel, i.e. several replacement signals are generated. These are weighted according to their coherence function, combined and inserted into the dropout.

Generally, the functions used in 1. to 9. are time-varying, thus a mathematically exact notation must consider the time dependency by a (block) index m. To simplify the formulations, m has been omitted.

Calculation During Error-Free Transmission

The computation during error-free transmission is performed in frequency domain, thus in a first step an appropriate short-term transformation may be necessary, resulting in a block-oriented algorithm that requires a buffering of target and substitution signal. Preferably, the block size should be aligned to the coding format. The estimation of the envelopes of the magnitude spectra of target and substitution signal are used to determine the magnitude response of the concealment filter. The exact narrow-band magnitude spectra of the two signals are not relevant, rather broad-band approximations are sufficient, optionally time-averaged and/or non-linearily distorted by a logarithmic or power function. The estimation of the spectral envelopes can be implemented in various ways. The most efficient possibility concerning computational efficiency is the short-term Discrete Fourier Transform (DFT) with short block length, i.e. the spectral resolution is low. A signal block is multiplied by a window function (e.g. Hanning), subjected to the DFT, the magnitude of the short-term DFT is optionally distorted non-linearly and subsequently time-averaged.

Further Implementations:

Wavelet transformation, with optional subsequent time-averaging of the optionally non-linear distortion of the absolute values of the wavelet transformation. One or more examples are described in Daubechies I.; "Ten Lectures on Wavelets"; Society for Industrial and Applied Mathematics; Capital City Press, ISBN 0-89871-274-2, 1992.

Gammatone filter bank with subsequent formation of the signal envelopes of the individual subbands, optionally followed by a non-linear distortion. One or more examples are described in Irino T., Patterson R. D.; "A compressive gammachirp auditory filter for both physiological and psychophysical date"; J. Acoust. Soc. Am., Vol. 109, pp. 2008-2022, 2001.

Linear prediction with subsequent sampling of the magnitude of the spectral envelopes of the signal block, represented by the synthesis filter, optionally followed by a non-linear distortion and, subsequent to this, time-averaging. One or more examples are described in Haykin S.; "Adaptive Filter Theory"; Prentice Hall Inc.; Englewood Cliffs; ISBN 0-13-048434-2, 2002.

Estimation of a real cepstrum followed by a retransformation of the cepstrum domain into the frequency domain and taking the antilogarithm, optionally followed by a non-linear distortion of the so obtained envelopes of the magnitude spectra and, subsequent to this, time-averaging. One or more examples are described in Deller J. R., Hansen J. H. L., Proakis J. G.; "Discrete-Time Processing of Speech Signals"; IEEE Press; ISBN 0-7803-5386-2, 2000.

Short-term DFT with maximum detection and interpolation: Here, the maxima are detected in the magnitude spectrum of the short-term DFT and the envelope between neighboring maxima are calculated by means of linear or non-linear interpolation, optionally followed by a non-linear distortion of the so obtained envelopes of the magnitude spectra and, subsequent to this, time-averaging.

For the optionally used time-averaging of the envelopes, an exponential smoothing of the optionally non-linearly distorted magnitude spectra can be used, as represented in equations (1) with time constant $\alpha$ for the exponential smoothing. Alternatively, the time-averaging can be formed by a moving average filter. The non-linear distortion can, for example, be carried out by means of a power function with arbitrary exponents which, in addition, can be selected differently for the target and substitution channel, as depicted in equations (1) by the exponents $\gamma$ and $\delta$. (Alternatively, a logarithmic function can also be used.)

The non-linear distortion offers the advantage of weighting time periods with high or low signal energy differently along the time-varying progression of each frequency component. The different weighting affects the results of time-averaging within the respective frequency component. Accordingly, exponents $\gamma$ and $\delta$ greater than 1 denote an expansion, i.e. peaks along the signal progression dominate the result of the time-averaging, whereas exponents less than 1 signify a compression, i.e. enhance periods with low signal energy. The optimal selection of the exponent values depends on the sound material to be expected.

$$|\overline{S_Z(m)}| = \{\alpha|S_Z|^\gamma + (1-\alpha)|\overline{S_Z(m-1)}|^\gamma\}^{\frac{1}{\gamma}}, \quad (1a)$$

$$|\overline{S_S(m)}| = \{\alpha|S_S|^\delta + (1-\alpha)|\overline{S_S(m-1)}|^\delta\}^{\frac{1}{\delta}} \quad (1b)$$

where $|S_Z|$, $|S_S|$: envelopes of the magnitude spectra of target and substitution channel, $\overline{|S_Z|}$, $\overline{|S_S|}$: time-averaged versions of $|S_Z|$ and $|S_S|$, $\alpha$: time constant of the exponential smoothing, $0<\alpha\leq 1$, $\gamma$, $\delta$: exponents of the non-linear distortion of $\overline{|S_Z|}$ and $\overline{|S_S|}$, with a preferable value range of: $0.5\leq\gamma$, $\delta\leq 2$, m: block index.

As an example, equations (1) constitute a special case for the calculation of the spectral envelopes of target and substitution channel with exponential smoothing and arbitrary distortion exponents. In the following, the exponents are set to $\gamma=\delta=1$ to simplify formulations (i.e. a non-linear distortion is not explicitly indicated). However, the system comprises the method with any time-averaging methods and any non-linear distortions of the envelopes of the magnitude spectra and hence, any values for the exponents $\gamma$ and $\delta$. Beyond, the use of the logarithm of the exponential function is enclosed, too. To simplify notation, the block index m is omitted, though all magnitude values such as $\overline{|S_S|}$, $\overline{|S_Z|}$ or H are considered to be time-variant and therefore a function of block index m.

Calculation of the Concealment Filter

In adaptive systems, concealment filters may be calculated by minimizing the mean square error between the target signal and its estimation. The difference signal is given by $e(n)=x_Z(n)-\hat{x}_Z(n)$. In contrast, the present system examines the error of the estimated magnitude spectra:

$$E(k)=\overline{|S_Z(k)|}-\overline{|\hat{S}_Z(k)|}=\overline{|S_Z(k)|}-H(k)\overline{|S_S(k)|} \quad (2)$$

E(k) corresponds to the difference between the envelope of the magnitude spectra of the optionally non-linearly distorted optionally smoothed target signal and its estimation. The optimization problem is observed separately for each frequency component k. The simplest realisation of the spectral filter H(k) would be determined by the two envelopes, with $$H(k) = \frac{\overline{|S_Z(k)|}}{\overline{|S_S(k)|}}. \quad (3)$$

Alternatively, a constraint of H(k) is suggested through the introduction of a regularization parameter. The underlying intention is to prevent the filter amplification from rising disproportionally if the signal power of $\overline{|S_S|}$ is too weak and hence, background noise becomes audible or the system becomes perceptibly instable. If, for example, the spectral peaks of one time-block of $\overline{|S_Z|}$ and $\overline{|S_S|}$ are not located in exactly the same frequency band, H(k) will rise excessively in these bands in which $\overline{|S_Z|}$ has a maximum and $\overline{|S_S|}$ has a minimum. To avoid this problem, a constraint for H(k) is established through the frequency-dependent regularisation parameter $\beta(k)$, yielding $$H(k) = \frac{|S_Z(k)||S_S(k)|}{|S_S(k)|^2 + \beta(k)}. \qquad (4)$$

Through positive real-valued β(k), the filter amplification will not increase immoderately, even with a small value for $\overline{|S_S|}$, and hence, will prevent undesired signal peaks. The optimal values for β(k) depend on the signal statistics to be expected, whereas a computation based on an estimation of the background noise power per frequency band is described. The background noise power $P_g(k)$ can be estimated incorporating the time-averaged minimum statistics. The regularisation parameter β(k) is proportional to the rms value of the background noise power, according to:

$$\beta(k) = c \cdot [P_g(k)]^{\frac{1}{2}},$$

and c typically between 1 and 5.

An alternative implementation of H is proposed specifically for quasi-stationary input signals. The envelopes of the magnitude spectra are first estimated without time-averaging and optionally non-linear distortion. Both modifications are considered during the determination of the filter coefficients, according to:

$$\overline{H(m,k)} = \left\{ \alpha \left[ \frac{|S_Z(m,k)||S_S(m,k)|}{|S_S(m,k)|^2 + \beta(k)} \right]^{\gamma} + (1-\alpha)\overline{H(m-1,k)}^{\gamma} \right\}^{\frac{1}{\gamma}} \qquad (5)$$

In equation (5), both the block index m and the frequency index k are indicated, since the computation simultaneously depends on both indices in this case. The parameters α and γ determine the behaviour of the time-averaging or the non-linear distortion.

Calculations in the Event of Dropouts in a Target Signal

The possibilities for detecting a dropout are numerous. For example, a status bit can be transmitted at a reserved position within the respective audio stream (e.g. between audio data frames), and continuously registered at the receiver side. It would also be conceivable to perform an energy analysis of the individual frames and to identify a dropout if it falls below a certain threshold. A dropout could also be detected through synchronization between transmitter and receiver.

Figure 10:
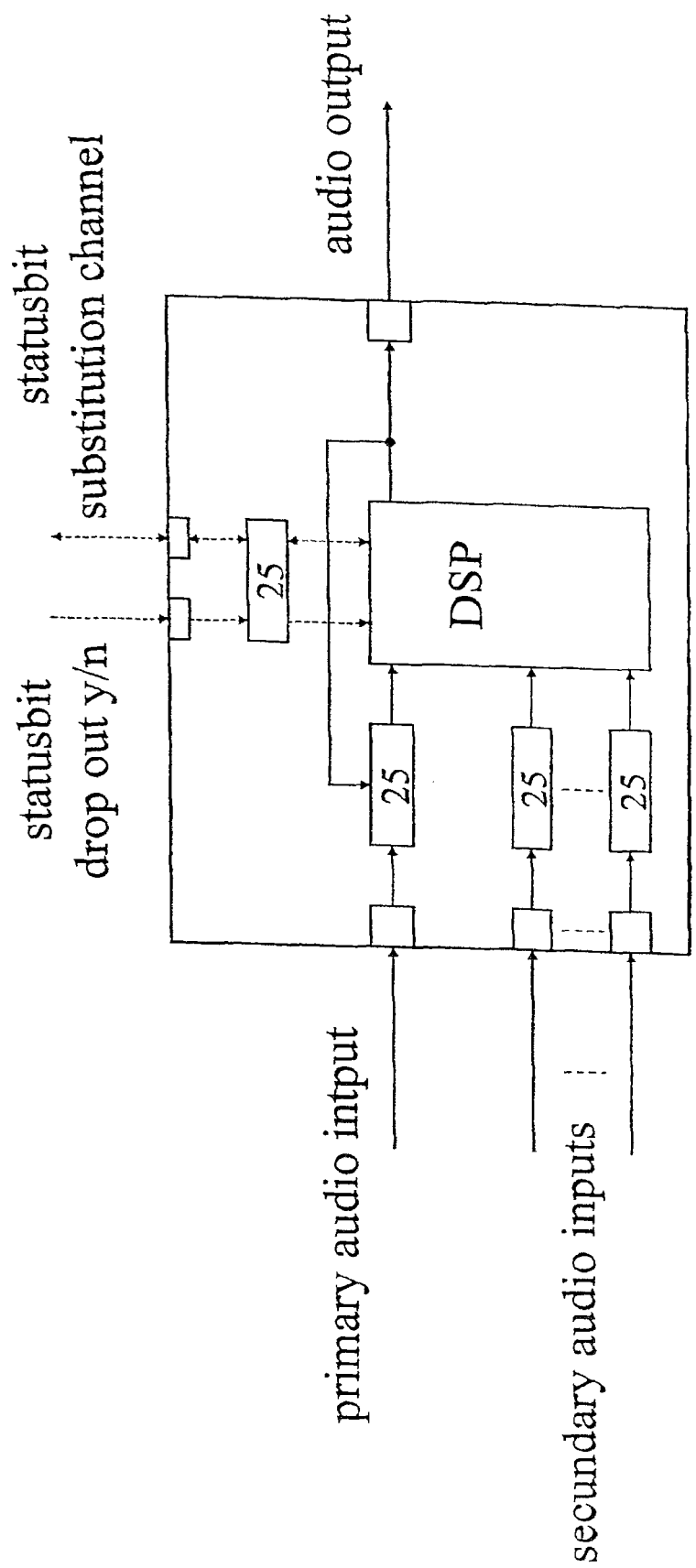
FIG. 10 shows the layout of an example device for dropout concealment that can be integrated into each channel of a multi-channel arrangement.

If a dropout is detected in the target signal (e.g. as represented in FIGS. 7 and 10 by a status bit "dropout y/n"; the dotted line denotes the status bit that is actually transmitted contiguously with the audio signal), the replacement signal must be generated using the lastly estimated filter coefficients and the substitution channel(s), and is directly fed to the output of the concealment unit. During a dropout, the estimation of the filter coefficients is deactivated. Basically, the transition between target and replacement signal can be implemented by a switch, assuming any switching artifacts remaining inaudible. In one example, a cross-fade between the signals is proposed as being advantageous, but this requires a buffering of the target signal, hence inducing additional latency. In particularly delay-critical real-time systems that do not allow for any additional buffering, a cross-fade is not readily possible. In this case, an extrapolation of the target signal is proposed, for example by means of linear prediction. The cross-fade is carried out between the extrapolated target signal and the replacement signal by using the method according to the system.

The replacement signal is finally generated through filtering of the substitution signal with the filter coefficients retransformed into the time domain. The inverse transformation of the filter coefficients $T^{-1}\{H\}$ should be carried out with the same method as the first transformation. Prior to the filtering, the filter impulse response is optionally time-limited by a windowing function w(n) (e.g. rectangular, Hanning)

$$h_w(n) = w(n)T^{-1}\{H(k)\} \text{ or } \overline{h_w(n)} = w(n)T^{-1}\{\overline{H(k)}\} \qquad (6)$$

The impulse response $h_w(n)$ or $\overline{h_w(n)}$, respectively, must only be calculated once at the beginning of the dropout, since the continuous estimation of the filter coefficients is deactivated during the dropout. For the sample-wise determination of the replacement signal $\hat{x}_Z$, an appropriate vector of the substitution signal $x_S$ is necessary, $$\hat{x}_Z(n) = h_w^T x_S(n) \text{ or } \hat{x}_Z(n) = \overline{h_w}^T x_S(n). \qquad (7)$$

In some applications, the filtering can be performed in the frequency domain. Thus, the coefficients optionally windowed in the time domain are transformed back into the frequency domain, so that the replacement signal of a block is computed by:

$$\hat{x}_Z(n) = T^{-1}\{H_w^*(k)X_S(k)\} \qquad (8)$$

Successive blocks are combined using methods such as overlap and add or overlap and save.

The replacement signal is continued beyond the end of the dropout to enable a cross-fade into the re-existing target signal.

Estimation of the Time Delay Between Target and Substitution Signal

In a particularly preferred embodiment of the present concealment method, the time-alignment of target and replacement signal can be improved, too. Therefore, a time delay is estimated, parallel to the spectral filter coefficients that take two components into account. On the one hand, the delay of the replacement signal resulting from the filtering process must be compensated for, $$\tau_1 = \frac{L_{Filter}}{2}.$$

On the other hand, a time delay $\tau_2$ between target and substitution channel originates due to the spatial arrangement of the respective microphones. This can be estimated, for example, by means of the generalized cross-correlation (GCC) that requires the computation of complex short-term spectra. In a preferred implementation, the short-term DFT employed for the estimation of the concealment filter can be exploited, too, obviating additional computational complexity. Characteristics of an example GCC implementation are described in Carter, G. C.: "Coherence and Time Delay Estimation"; Proc. IEEE, Vol. 75, No. 2, February 1987; and Omologo M., Svaizer P.: "Use of the Crosspower-Spectrum Phase in Acoustic Event Location"; IEEE Trans. on Speech and Audio Processing, Vol. 5, No. 3, May 1997. The GCC is calculated using inverse Fourier transform of the estimated generalized cross-power spectral density (GXPSD), which is defined by:

$$\Phi_{G,ZS}(k) = G(k)X_Z(k)X_S^*(k) \qquad (9)$$

(again, in equations 9-12, the block index m is omitted.)

In equation (9), $X_Z(k)$ and $X_S(k)$ are the DFTs of a block of the target or substitution channel, respectively; * denotes complex conjugation. G(k) represents a pre-filter the aim of which is explained in the following.

The time delay $\tau_2$ is determined by indexing the maximum of the cross-correlation. The detection of the maximum can be improved by approximating its shape to a delta function. The pre-filter G(k) directly affects the shape of the GCC and thus, enhances the estimation of $\tau_2$. A proper realization denotes the phase transform filter (PHAT):

$$G_{PHAT}(k) = \frac{1}{|X_Z(k)X_S^*(k)|}. \quad (10)$$

This results in the GXPSD with PHAT filter:

$$\Phi_{G,ZS}(k) = \frac{X_Z(k)X_S^*(k)}{|X_Z(k)X_S^*(k)|} = \frac{\Phi_{ZS}(k)}{|X_Z(k)X_S^*(k)|}, \quad (11)$$

where $\Phi_{ZS}$: cross-power spectral density of target and substitution signal. Another possibility is offered by the complex coherence function whose pre-filter can be calculated from the power density spectra, yielding:

$$\Gamma_{ZS}(k) = \frac{\Phi_{ZS}(k)}{\sqrt{\Phi_{ZZ}(k)\Phi_{SS}(k)}} \quad (12)$$

$\Phi_{ZZ}$: auto-power spectral density of the target signal,
$\Phi_{SS}$: auto-power spectral density of the substitution signal.
The transformation of the signals into the frequency domain may be implemented by means of short-term DFT. The block length must, on the one hand, be selected large enough in order to facilitate peaks in the GCC that are detectable for the expected time delays but, on the other hand, excessive block lengths lead to increased need for storage capacity. To adequately track variations of the time delay $\tau_2$, time-averaging of the GXPSD or of the complex coherence function is proposed (e.g. by exponential smoothing)

$$\overline{\Phi_{G,ZS}(m,k)} = \mu \frac{\Phi_{ZS}(m,k)}{|X_Z(m,k)X_S^*(m,k)|} + (1-\mu)\overline{\Phi_{G,ZS}(m-1,k)}, \quad (13)$$

$$\overline{\Gamma_{ZS}(m,k)} = \nu \frac{\Phi_{ZS}(m,k)}{\sqrt{\Phi_{ZZ}(m,k)\Phi_{SS}(m,k)}} + (1-\nu)\overline{\Gamma_{ZS}(m-1,k)}. \quad (14)$$

In equations (13) and (14), m refers to the block index. The smoothing constants are designated with $\mu$ and $\nu$. These must be adapted to the jump distance of the short-term DFT and the stationarity of $\tau_2$ in order to obtain the best possible estimation of the coherence function or the generalized cross-power spectral density, respectively.

After the retransformation into the time domain and the detection of the maximum of the GCC, the entire time delay element between target and replacement signal can be formulated by $$\Delta\tau = \tau_2 - \tau_1. \quad (15)$$

The individual processing steps are summarized in a block diagram in FIG. 7 for one target and one substitution signal. The transition between target and replacement signal or vice-versa is depicted as a simple switch in the graphic; as has already been mentioned, a cross-fade of the signals is recommendable.

Figure 8:
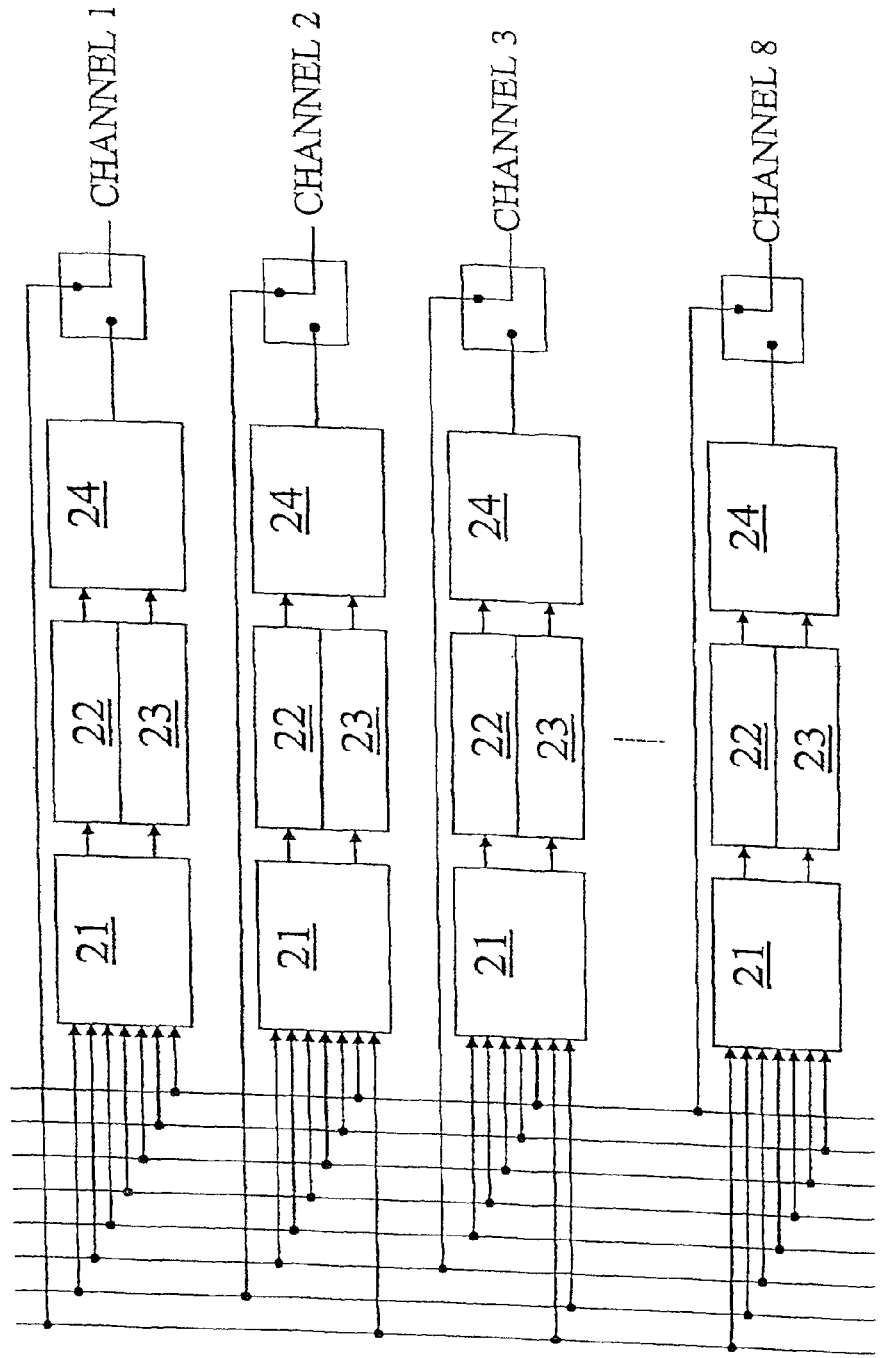
FIG. 8 shows a block diagram of an example of a multi-channel arrangement of, for example eight channels.

An example of a multi-channel setup with more than two channels is depicted FIG. 8. Depending on which channel is affected by dropouts and hence becomes the target channel, the substitution signal is generated with the remaining intact channels. The discrete blocks of FIG. 8 correspond to the following processing steps:

21 Selection of the substitution channel(s)
22 Calculation of the filter coefficients
23 Application of a time delay
24 Generation of a replacement signal In the uppermost row of FIG. 8, a replacement signal is generated for channel 1, which is afflicted by dropouts. To achieve this, either one, several, or all of the channels 2 to 7 can be used. The second row corresponds to the reconstruction of channel 2, etc.

Figure 9:
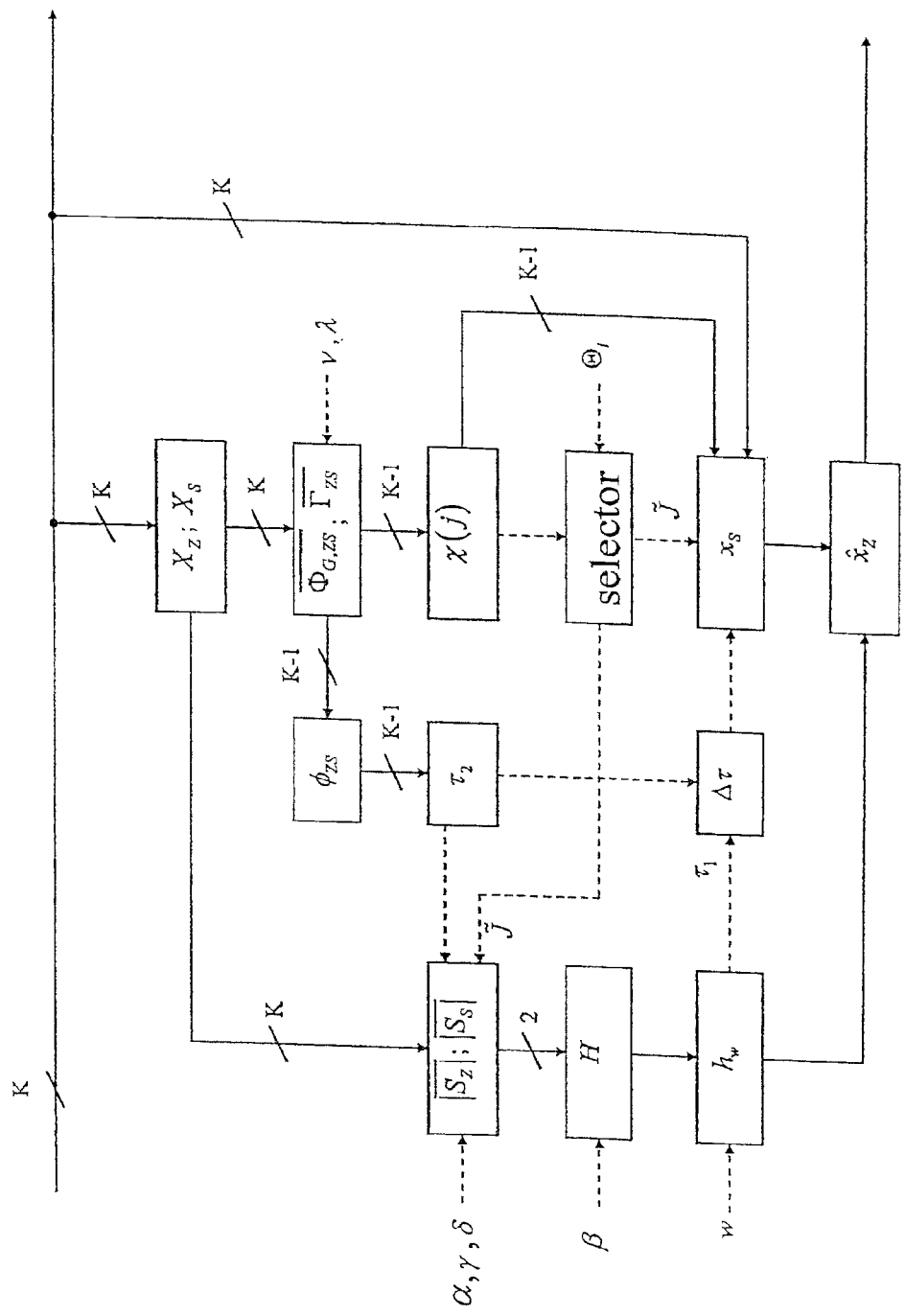
FIG. 9 shows an example flowchart of the system.

FIG. 9 shows a schematic of the basic algorithm in combination with the expansion stage (i.e. time delay estimation) to illustrate the mutual dependencies of the individual processing steps. To simplify the block diagram, parallel signals (DFT blocks) or (spectral) mappings derived thereof are merged into one (solid) line, the number of which is indicated by K or K−1, respectively. The dotted connections denote the transfer or input of parameters. The first selection of the substitution channels is done in the block labeled "selector" according to the GXPSD. On the one hand, this affects the computation of the envelopes of the magnitude spectra of the substitution signal and, on the other hand, it may be needed for the weighted superposition of the same. The second selection criterion is offered by the time delay $\tau_2$. The status bits of the channels are not depicted explicitly, but their verification is considered in relevant signal-processing blocks. Additionally, the particular determination of the target signal can be omitted from this illustration.

Hardware Implementation

This method for dropout concealment may work as an independent module and may be installed into a digital signal processing chain, for example the software-specified algorithm may be implemented on a commercially available digital signal processor (DSP), preferably a special DSP for audio applications. Accordingly, for each channel of a multi-channel arrangement, an appropriate device, such as exemplarily depicted in FIG. 10, may be integrated directly into the apparatus for receiving and decoding the transmitted digital audio data.

The apparatus for dropout concealment is equipped with a primary audio input that adopts the digital signal frames from the receiver unit and temporarily stores them in a storage unit 25. The apparatus is equipped with at least one secondary audio input, optionally several secondary audio inputs, at which the digital data of the substitution channel(s) are available and likewise stored temporarily in one, optionally several, storage unit(s) 25.

In addition, the device features an interface for the transmission of control data such as the status bit of the signal frames (dropout y/n) or an information bit for the selection of the substitution channel(s), the latter requiring (a) a bidirectional data line and (b) a temporary storage unit 25.

In order to forward the original or concealed data frames of the primary channel, the apparatus is equipped with an audio output. A separate storage unit for the data blocks to be output is not necessary, since they can be stored as needed in the storage unit of the input signal.

Figure 11:
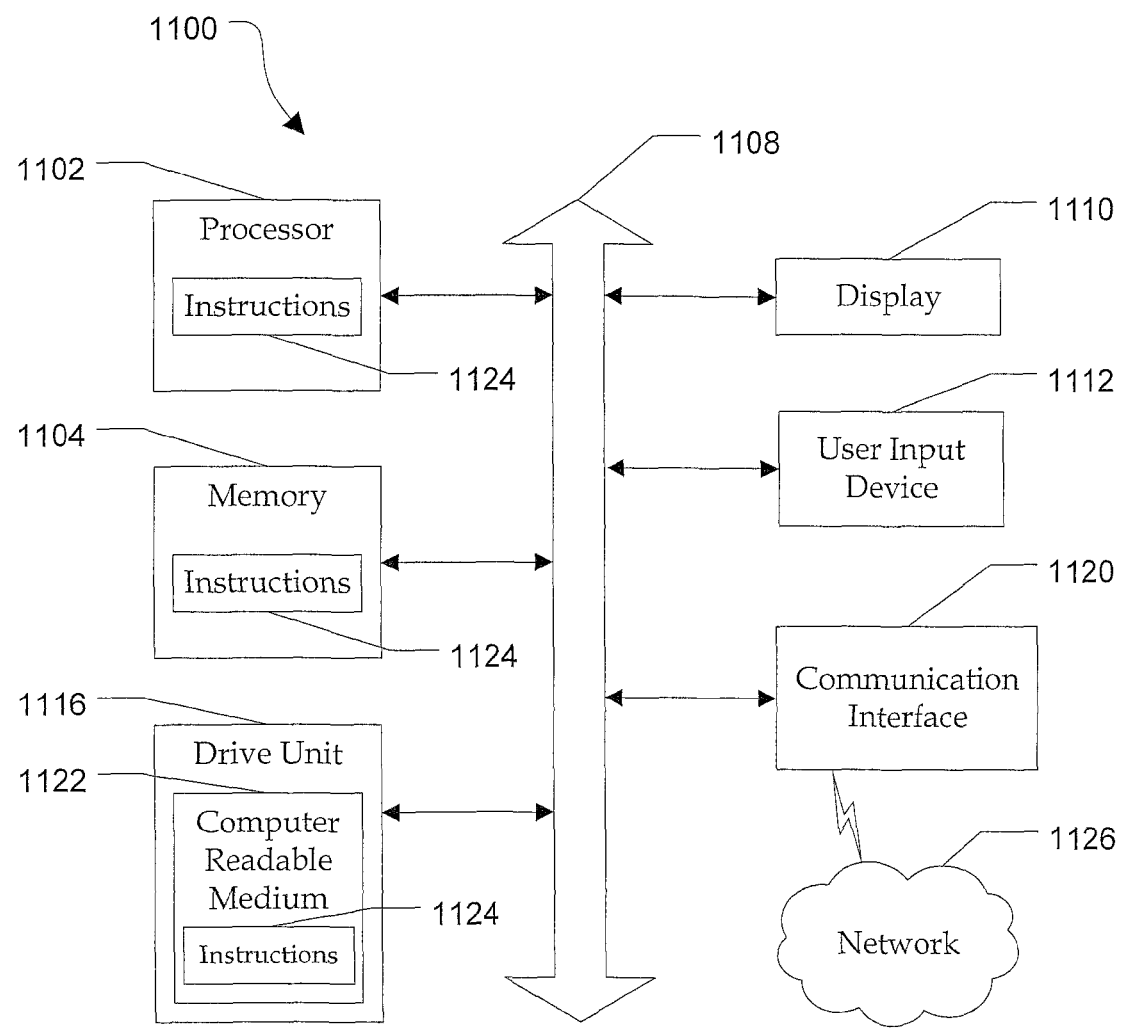
FIG. 11 is an example computing device for use with the system.

One or more of the DSP, the apparatus for receiving and decoding data, the switching unit, the concealment unit, the diversity-receiving device, or any other parts of the system for receiving digital data may be and/or may include a portion or all of one or more computing devices of various kinds, such as the computing device in FIG. 11. FIG. 11 illustrates an example of a general computing device or computer system designated 1100. Any of the components from the system may include a portion or all of the computer system 1100. Thus, some components of FIG. 11 may be omitted in various applications. For example, in some examples, the computer system 1100 may include only a processor, such as a DSP, and memory either internal to the DSP or external to the DSP, or both internal and external memories.

The computer system 1100 can include a set of instructions that can be executed to cause the computer system 1100 to perform any one or more of the methods or computer based functions disclosed. The computer system 1100 may operate as a standalone device or may be connected, e.g., using a network, to other computer systems or peripheral devices. In a networked deployment, the computer system 1100 may operate in the capacity of a server or as a client user computer in a server-client user network environment, or as a peer computer system in a peer-to-peer (or distributed) network environment.

The computer system 1100 can be implemented as or incorporated into various devices, such as a microphone, an audio device, a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 1100 can be implemented using electronic devices that provide voice, audio, video or data communication. Further, while a single computer system 1100 is illustrated, the term "system" shall also be taken to include any collection of systems or sub-systems that individually or jointly execute a set, or multiple sets, of instructions to perform one or more computer functions.

In FIG. 11, the example computer system 1100 may include a processor 1102, e.g., a digitial signal processor (DSP), a central processing unit (CPU), a graphics processing unit (GPU), or some combination. The processor 1102 may be a component in a variety of systems. For example, the processor 1102 may be part of an audio device or a wireless device. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The term "module" or "unit" may be defined to include a plurality of executable components. As described herein, the modules or units are defined to include software, hardware or some combination thereof executable by a processor, such as processor 1102. Software modules may include instructions stored in memory, such as memory 1104, or another memory device, that are executable by the processor 1102 or other processor. Hardware modules may include various devices, components, circuits, gates, circuit boards, and the like that are executable, directed, and/or controlled for performance by the processor 1102.

The computer system 1100 may include a memory 1104, such as a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1104 includes a cache or random access memory for the processor 1102. The memory may be included with the processor 1102. In alternative examples, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1100 may or may not further include a display 1110, such as indicators lights, a liquid crystal display (LCD), an organic light emitting diode (OLED), a flat panel display, a solid state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1116.

Additionally, the computer system 1100 may include an input device 1112 configured to allow a user to interact with any of the components, modules or units of system. The input device 1112 may be a number pad, a keyboard, or a cursor control device, such as a mouse, or a joystick, touch screen display, remote control or any other device operative to interact with the computer system 1100.

In a particular example, as depicted in FIG. 11, the computer system 1100 may also include a disk or optical drive unit 1116. The disk drive unit 1116 may include a computer-readable medium 1122 in which one or more sets of instructions 1124, e.g. software, can be embedded. Further, the instructions 1124 may embody one or more of the methods or logic as described. In a particular example, the instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium that includes instructions 1124 or receives and executes instructions 1124 responsive to a propagated signal so that a device connected to a network 1126 can communicate voice, video, audio, images or any other data over the network 1126. Further, the instructions 1124 may be transmitted or received over the network 1126 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1126, external media, the display 1110, or any other components in system 1100, or combinations thereof. The connection with the network 1126 may be a physical connection, such as a wired Ethernet connection or may be established wirelessly as discussed later. Likewise, the additional connections with other components of the system 1100 may be physical connections or may be established wirelessly. The network 1126 may alternatively be directly connected to the bus 1108.

The network 1126 may include wired networks, wireless networks, Ethernet AVB networks, or combinations thereof. The wireless network may be a cellular telephone network, an 802.11, 802.16, 802.20, 802.1Q or WiMax network. Further, the network 1126 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules (units) or parts of modules (units) included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for receiving digital audio data with a diversity-receiving unit, the method comprising:
    providing at least two antennas and at least one receiving channel, which can be switched between a first one of the at least two antennas and a second one of the at least two antennas;
    detecting a disturbance in a received audio signal with a processor;
    activating dropout concealment in the at least one receiving channel with the processor when the disturbance in the received audio signal are detected;
    the processor using intact audio signal parts from at least one of before the disturbance, or after the disturbance to synthesize a concealment signal; and
    switching the receiving channel from the first one of the at least two antennas to the second one of the at least two antennas only after the dropout concealment is activated.

2. The method according to claim 1, where switching of the at least one receiving channel from the first one of the at least two antennas to the second one of the at least two antennas occurs at a time interval in which the dropout concealment is activated and the concealment signal is present on the at least one receiving channel.

3. The method according to claim 1, where the received audio signal comprises a digital data stream, and the digital data stream at times contains guard intervals between audio data with which no audio data are transmitted, and switching of the at least one receiving channel from the first one of the at least two antennas to the second one of the at least two antennas occurs in the guard interval following activation of the dropout concealment.

4. The method according to claim 1, where switching from the first one of the at least two antennas to the second one of the at least two antennas occurs during receipt of the audio signal.

5. The method according to claim 1, where the received audio signal comprises a digital data stream that at times contains guard intervals between audio data, the guard intervals having no audio data transmitted, and switching from the first one of the at least two antennas to the second one of the at least two antennas occurs during receipt of the audio signal, and under a condition that receiving is poorer on the second one of the at least two antennas than on the first one of the at least two antennas, the method comprising switching back to the first one of the at least two antennas in a subsequent guard interval.

6. The method according to claim 1, where received audio signal comprises a digital data stream that at times contains guard intervals between audio data, the guard intervals having no audio data are transmitted, and switching from the first one of the at least two antennas to the second one of the at least two antennas occurs during a guard interval, and under a condition that receiving is poorer on the second one of the at least two antennas than on the first one of the at least two antennas, the method further comprising switching back to the first one of the at least two antennas during subsequent receipt of the audio signal.

7. The method according to claim 1, where switching the at least one receiving channel from the first one of the at least two antennas to the second one of the at least two antennas comprises concealing at an output of the diversity-receiving unit with the concealment signal an effect on the output due to the switching and transmission errors occurring prior to the switching.

8. The method according to claim 1, where the received audio signal comprises a digital data stream, and the digital data stream is continuously provided in the absence of any form of guard intervals between audio data.

9. A diversity-receiving device comprising:
   at least two antennas configured to receive a radio signal;
   at least one receiving channel configured to receive the radio signal;
   a switching unit through which the at least one receiving channel is switched between a first of the at least two antennas and a second of the at least two antennas; and
   a concealment unit coupled with the switching unit, the concealment unit configured to synthesize a concealment signal in response to occurrence of disorders in the received radio signal,
   the switching unit configured to switch the receiving channel between the first of the at least two antennas and the second of the at least two antennas only after the synthesized concealment signal is supplied on the receiving channel.

10. A diversity-receiving device according to claim 9, where the switching unit is configured to switch the receiving channel between the first of the at least two channels and the second of the at least two channels in a time interval in which the concealment signal is being supplied on the receiving channel.

11. A diversity-receiving device according to claim 9, where the radio signal is a digital data stream that at times contains guard intervals between audio data within which no audio data are transmitted, and the switching unit is configured to switch between the first of the at least two antennas and the second of the at least two antennas in the guard interval following concealment.

12. A diversity-receiving device according to claim 9, where the at least one receiving channel comprises at least two receiving channels, and the switching unit is configured to switch the at least two receiving channels to each antenna independent of each other.

13. A diversity-receiving device according to claim 9, further comprising an audio decoder coupled with the concealment unit, the audio decoder configured to replace the audio signal with the synthesized concealment signal on the receiving channel.

14. A diversity-receiving device according to claim 9, where the radio signal comprises a seamless and continuously unbroken digital stream of audio data.

15. A diversity-receiving device according to claim 9, where the switching unit includes a switching matrix and switching logic, the switching logic being responsive to a bit error rate and a receiver signal strength indicator of the audio signal to control switching of the at least two antennas to the receiving channel using multiplexers included in the switching matrix.

16. A non-transient computer readable medium configured to store computer readable instructions executable with a processor, the computer readable medium comprising:
   instructions to receive on a receiving channel from a first antenna or a second antenna a continuous and unbroken streaming audio signal comprising a digital audio stream;
   instructions to monitor a bit error rate of the received streaming audio signal;
   instructions to monitor a signal intensity of the received streaming audio signal;
   instructions to generate a synthesized concealment signal in response to the bit error rate being above a first predetermined threshold, or in response to the signal intensity being below a second predetermined threshold;
   instructions to replace the streaming audio signal with the synthesized concealment signal on the receiving channel; and
   instructions to switch the receiving channel between the first antenna and the second antenna only when the streaming audio signal is replaced with the synthesized concealment signal on the receiving channel.

17. The computer readable medium of claim 16, where the instructions to switch the receiving channel comprise instructions to switch the receiving channel while the receiving channel is continuously receiving the streaming audio signal.

18. The computer readable medium of claim 16, where the concealment signal is configured to minimize switching artifacts produced by switching between the first antenna and the second antenna to a level that is not audible to a user.

19. The computer readable medium of claim 16, where the instructions to switch the receiving channel between the first antenna and the second antenna are executed in the absence of a guard interval used for antenna switching being present in the received streaming audio signal.

20. The computer readable medium of claim 16, where switching of the at least one receiving channel between the first of the at least two antennas and the second of the at least two antennas occurs at a time interval in which dropout concealment is activated and the synthesized concealment signal is present on the at least one receiving channel.

* * * * *